United States Patent [19]

Kepley et al.

[11] Patent Number: 4,790,003

[45] Date of Patent: Dec. 6, 1988

[54] MESSAGE SERVICE SYSTEM NETWORK

[75] Inventors: Garry D. Kepley, Boulder; John R. Lothrop, Longmont; Albert Mizrahi, Boulder, all of Colo.

[73] Assignee: American Telephone and Telegraph Company, AT&T Information Systems, Holmdel, N.J.

[21] Appl. No.: 43,016

[22] Filed: Apr. 27, 1987

[51] Int. Cl.$^4$ .................... H04M 3/50; H04M 11/00
[52] U.S. Cl. ........................................ 379/88; 379/96; 379/142
[58] Field of Search ............... 379/96, 88, 142, 93, 379/89

[56] References Cited

U.S. PATENT DOCUMENTS

| | | | |
|---|---|---|---|
| 4,266,098 | 5/1981 | Novak | 379/142 X |
| 4,304,968 | 12/1981 | Klausner et al. | 379/142 X |
| 4,436,963 | 3/1984 | Cottrell et al. | |
| 4,506,111 | 3/1985 | Takenouchi et al. | |
| 4,549,047 | 10/1985 | Brian et al. | 379/88 |
| 4,581,486 | 4/1986 | Matthews et al. | 379/88 |
| 4,612,416 | 9/1986 | Emerson et al. | |
| 4,625,081 | 11/1986 | Lotito et al. | 379/196 X |
| 4,646,346 | 2/1987 | Emerson et al. | |

FOREIGN PATENT DOCUMENTS

| | | | |
|---|---|---|---|
| 60-121863 | 6/1985 | Japan | 379/142 |
| WO86/05650 | 9/1986 | World Int. Prop. O. | 379/96 |

OTHER PUBLICATIONS

Hedman, "MD-110 in the Automated Office", Ericsson Review, No. 2, 1983, pp. 88–93.

Lee et al., "Meridian SL Information Services", Telesis 1985 two, pp. 12–19.

T. Kamae, "Development of a Public Facsimile Communication System Using Storage and Conversion Techniques", IEEE, 1980 National Telecommunications Conference, Houston, Tex., Nov. 30–Dec. 4, 1980, pp. 19.4.1 to 19.4.5.

Bayer & Thompson, "An Experimental Teleterminal-The Software Strategy", *The Bell System Technical Journal*, vol. 62, No. 1, Jan. 1983, pp. 121–144.

Primary Examiner—Keith E. George
Attorney, Agent, or Firm—John C. Moran

[57] ABSTRACT

This invention relates to business communication systems and, in particular, to a message service system network that interconnects a plurality of message service systems and provides a voice mail message transfer capability between voice mail message service systems. The voice mail message transfer is performed as a computer-to-computer data file transfer operation over high speed data lines. The data file consists of the digitally encoded and compressed voice mail message to which is appended the message sender's name and telephone number as well as the message recipient's telephone number.

12 Claims, 7 Drawing Sheets

MESSAGE SERVICE SYSTEM NETWORK

FIELD OF THE INVENTION

This invention relates to business communication systems and, in particular, to a message service system network that interconnects a plurality of message service systems and provides a voice mail message transfer capability between message service systems.

BACKGROUND OF THE INVENTION

Message services is the term used to collectively identify the various office automation systems associated with a telephone switching system. These office automation systems are used to improve the productivity of the white collar worker in an office environment by providing an asynchronous voice (or short text message) communication medium.

The voice mail service system is one example of these message services. The voice mail service system offers two distinct communication features: Voice Mailbox (VM) and Call Answering (CA). The voice mailbox feature is involved when a message originator calls the voice mail service system by dialing an access code on the telephone station set touch-tone pad. The message originator identifies one or more message recipients who are also served by the telephone switching system by dialing their station numbers, and then generates a voice message for delivery by the voice mail service system to the designated message recipients. The delivery of the voice message may be immediate or at a scheduled time specified by the message originator. The delivery is passive in that the voice mail service system places the message in a mailbox assigned to each identified message recipient and activates the message recipient's message waiting indicator on the message recipient's telephone station set instead of actively calling the message recipient to playback the message. The message recipient may then access the voice mail service system to listen to the message, save the message for subsequent action, delete it, append comments and route the message to other message recipients, or reply and return a message to the message originator.

The call answering feature of voice mail service is geared to the convenience of the message recipient, unlike the voice mailbox feature which is geared towards aiding the message originator. The nonavailability of an individual to answer a telephone call results in that telephone call being redirected to the voice mail service system call answering feature. The caller receives a prerecorded announcement message from the absent individual and can then leave a voice message in the absent individual's voice mailbox.

The difficulty with existing voice mail service systems is that when a customer has a plurality of telephone switching systems with associated voice mail service systems, it is difficult to network the voice mail service systems together without incurring a significant transmission cost and a degradation of the quality of the voice transmission. The quality of the voice mail message transmission is a function of both the number of signal conversions and the quality of the transmission medium. A typical voice mail message system converts the received analog voice signal to digitally encoded form and stores this message in memory. The stored voice mail message is reconverted to analog form for transmission over standard voice-grade trunks to a distant voice mail system. The received analog voice mail message is reconverted into digitally encoded form and stored in memory in the distant voice mail system. The voice mail message remains in memory until the message recipient requests retrieval at which time the voice mail message is again converted to analog form and delivered to the message recipient.

Each analog-digital conversion operation negatively impacts on the voice quality of the voice mail message as well as uses expensive analog-digital signal conversion apparatus. In addition, the use of standard voice-grade trunks severely degrades the voice quality of the voice mail message. Some existing voice mail systems use automatic trunk test equipment to establish a test call between voice mail systems to determine the quality of the transmission medium before transmitting the voice mail message. Since the voice-grade trunks contain no error correction capability, this test call is one method of minimizing the loss of voice quality of the voice mail message.

The second factor is the cost of transmitting a voice mail message. This transmission cost is due to the fact that a voice mail message, generated on one voice mail service system and destined for a user served by another voice mail service system, must be transmitted along with header information over the transmission facilities that interconnect the plurality of message service systems. This transmission presently consists of the header and voice mail message in analog form, as received from the message originator. This voice mail message exchange consumes a significant amount of transmission capacity. For example, to provide the name of the message originator in the header requires approximately four seconds of speech which translates to 64K bits of PCM encoded data. To minimize the header information to reduce the transmission cost, the name of the message sender as well as the telephone number of the message sender is usually omitted from the voice mail message. The resultant transmission still occupies more time than the real-time transmission of the voice mail message. The exchange of a significant number of voice mail messages between two voice mail systems can apply a significant traffic load on the voice mail systems using such a message transmission arrangement.

These problems have presented a significant impediment to the networking of voice mail systems. As a result, existing voice mail networks provide poor quality voice transmissions at high cost.

SUMMARY OF THE INVENTION

These problems are solved and a technical advance achieved by the subject message service systems network which provides an efficient message transfer capability between message service systems. This message transfer capability includes the transmission of an in-depth header, containing for example the name of the message sender and the telephone number of the message sender and message recipient, along with the recorded message. This intermessage service system communication efficiently uses transmission oapaoity by performing the message transfer as a computer-to-computer data file transfer over high speed data lines which provides error correction capability. If a wideband transmission facility is available, this computer data file transmission can be executed faster than a realtime voice message transmission. In addition, a level of integration with existing text message services is accomplished to provide the called party with a uniform message notification regardless of whether the received message is a text or voice mail message.

The message service system network consists of a plurality of telephone switching systems each serving one or more associated message service system and a plurality of terminal devices to provide business communication services to a plurality of subscribers. A message sender at a first telephone switching system generates a voice mail message in well-known fashion on the associated originating voice mail service system and designates one or more message recipients who are served by a second or destination voice mail service system. The originating voice mail service system responds to this message origination by transmitting the recorded voice mail message to the destination voice mail service system at the message delivery time designated by the message sender.

The transmission of this voice mail message is efficiently accomplished by performing a computer-to-computer data file transfer between the originating and destination voice mail service systems. The data file consists of the digitally encoded and compressed voice mail message to which is appended a text header identifying the name and telephone number of the message sender and the telephone number of the message recipient. The resultant data file is formatted by the originating voice mail service system and transmitted to the destination voice mail service system, where it is stored in the message recipient's voice mail box. The voice mail message exchange between the voice mail service systems is accomplished by a computer-to-computer data file transfer via a data call connection. A computer data file transfer operation uses well-known data integrity and data correction arrangements to preserve the quality of the transmitted encoded and compressed voice mail message. In addition, existing data links between systems can be used to minimize the traffic load on the voice mail service systems.

The message recipient typically receives a message waiting indication on their telephone station set to indicate the presence of one or more unretrieved messages in one of the plurality of message service systems. To review the list of messages, the message recipient activates the message retrieval function at the telephone station set and the message headers are sequentially listed on the display of the telephone station set. The voice mail messages in existing systems were simply indicated by a listing such as "You have voice mail". No further information was available to the message recipientwithout independently accessing the voice mail service system and retrieving the voice mail messages. The present system, however, also has the identity of the message sender included in the header of the data file in text form. Therefore, the present system provides the message recipient with a list of message senders who have transmitted voice mail messages to the message recipient. This is accomplished by the destination voice mail service system sequentially transmitting the message sender's name from the header of each unretrieved voice mail message in the voice mailbox of the message recipient. The destination voice mail service system transmits the message sender's name in text form to the switch processor of the telephone switching system, which forwards the text via a control signaling channel to the message recipient's telephone station set. The text received at the telephone station set is listed on the display.

The present message service system network therefore efficiently interconnects a plurality of message service systems and transparently provides the message service independent of the ocation of the message sender and recipient. This network maintains the integrity of the voice mail message by using a computer-to-computer data file transfer operation to directly transfer the digitally encoded and compressed voice mail message.

DETAILED DESCRIPTION

Figure 1:
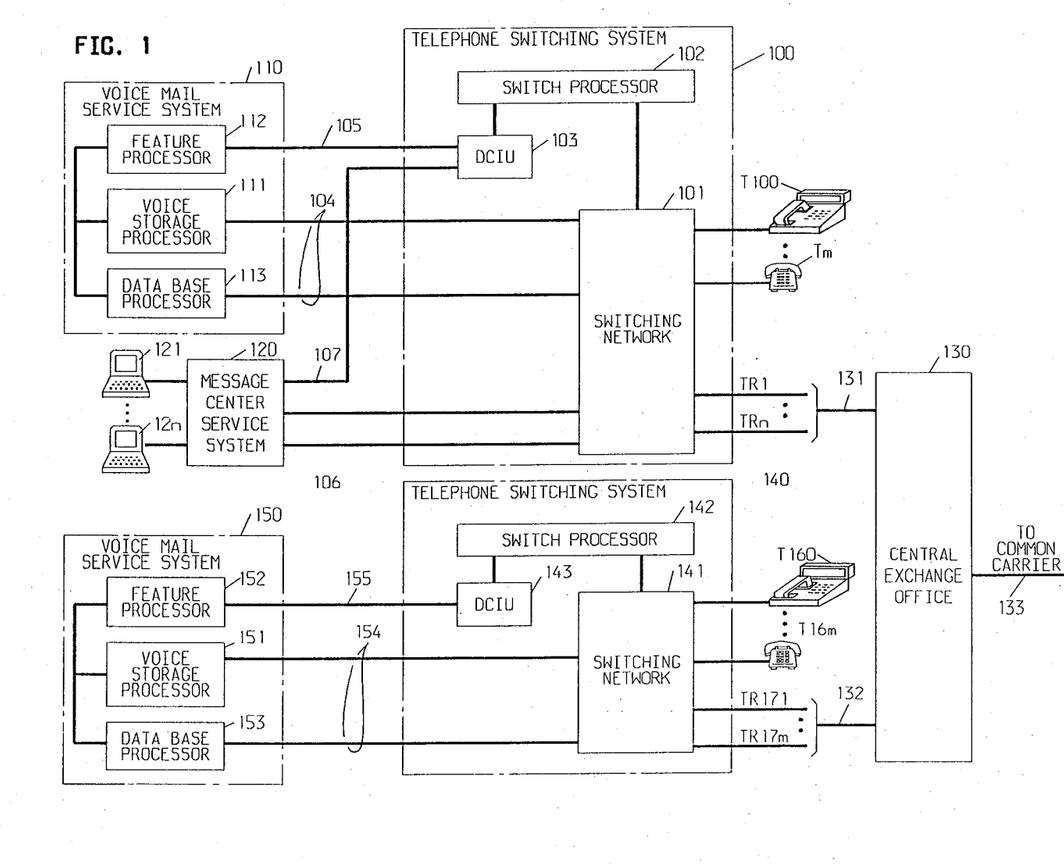
FIG. 1/ illustrates the subject message service system network in block diagram form.

The subject message service system network is shown in block diagram form in FIG. 1. The network of the exemplary embodiment illustrates one of many possible configurations. A plurality of telephone switching systems (100 and 140) are shown, each having associated message service systems (voice mail service system 110, message center service system 120 and voice mail service system 150, respectively). Each telephone switching system 100,140 serves a plurality of telephone station sets (T100-Tm and T160 - T16m) and is connected to a central exchange office 130 by a plurality of trunks (TR1-TRn and TR171-TR17n). The telephone switching systems 100,140 are shown connected to the same central exchange office 130, although they can be geographically separated and each served by a different central exchange office.

Each stored program controlled telephone switching system 100 provides business communication services to a plurality of trunk circuits T1-Tn and telephone station sets T100-Tm. Included in telephone switching system 100 is a switching network 101 for establishing communication connections among telephone station sets T100-Tm and trunk circuits T1-Tn. A switch processor 102 controls the operation of telephone switching system 100. The message service system network of FIG. 1 includes several message service systems: voice mail service system 110 which electronically stores and forwards voice messages, and message center service system 120 which provides operators at consoles 121-12n to record messages in text form for message originators. These systems are known in the art and, to illustrate the sbbject message transfer between a plurality of message service systems, voice mail service system 110 will be described in further detail below.

Telephone switching system 100 provides each telephone station set T100-Tm and trunk circuit T1-Tn with access to message service systems such as voice mail service system 110. An individual can directly call voice mail service system 110 from one of telephone station sets T100-Tm or trunk circuits T1-Tn or can redirect their incoming calls from their associated telephone station sets T100-Tm to voice mail service system 110. Telephone switching system 100 provides a control message communication link from switch processor 102 via data communication interface unit (DCIU) 103 and data link 105 to voice mail service system 110 to exchange call related information such as: new call, call disconnect, message waiting indication control, etc.

Voice Mail Service System Overview

An individual accesses voice mail service system 110 to, for example, generate a voice mail message by going off hook on their associated telephone station set T100 and dialing the voice mail service system access number. Switch processor 102 receives and decodes the dialed number in well-known fashion and connects telephone station set T100 to one of the voice mail service access lines 104 via switching network 101. This establishes a voice communication connection from telephone station set T100 via switching network 101 and voice mail service access line 104 to voice mail service system 110.

Switch processor 102 also simultaneously transmits a control message identifying the calling party to voice mail service system 110 through data communication interface unit 103 and over data link 105. Once a control message comes over data communication interface unit 103 from telephone switching system 100 announcing a new call, voice storage processor 111 and feature processor 112 interact directly with the message sender to provide the required message service features. Voice storage processor 111 controls the sequencing of the telephone call connection until a disconnect signal is received from the message sender. Voice storage processor 111 is comprised of many different elements working together to provide voice encoding capability. The hardware necessary to digitize voice and successfully buffer it before storing it in data base processor system 113 is part of voice storage processor 111.

Feature processor 112 provides the various system level features associated with voice mail service, such as mailing lists, message delivery, etc. Data base processor 113 serves as a mass storage element to store all the digitally encoded voice signals as well as control algorithms used by voice storage processor 111 and feature processor 112. Additional details of voice mail service system 110 are disclosed below.

Voice Mail Message Delivery

As part of the voice mail message creation session, the message sender at telephone station set T100 designates the time at which this voice mail message is scheduled for delivery to the message recipient (ex telephone station set T160). Feature processor 112 of voice mail service system 110 places this voice mail message in a queue in time of delivery ordered sequence. Feature processor 112 retrieves the stored voice mail message when the scheduled delivery time matches the present time or a prescheduled message delivery interval. The retrieved voice mail message indicates the identity of the message recipient, telephone station set T160. Since the message recipient is served by voice mail service system 150, feature processor 112 originates a data call to this destination voice mail service system 150 to transfer the retrieval voice mail message.

The transfer of a voice mail message is accomplished as a computer-to-computer data file transfer. The above-mentioned data call connection extends from originating voice mail service system 110 over one of communication lines 104, through telephone switching system 100, central exchange office 130, telephone switching system 140, over one of communication lines 154 to destination voice mail service system 150. This data call connection enables the two voice mail service systems 110, 150 to exchange data files.

In the present example, feature processor 112 formats the retrieved voice mail message for transmission over the data call connection. Feature processor 112 first reads the telephone number of the message sender from the retrieved voice mail message and uses this number to retrieve the name of the message sender from a user identification file in data base processor 113. The name of the message sender is appended, in text or phoneme form, to the retrieved voice mail message. Feature processor 112 additionally adds data file transfer header information to this retrieved voice mail message and transmits the resultant data file over the data call connection to destination voice mail service system 150. The data file is received by destination voice mail service system 150 where the data file header information is stripped off and the voice mail message, with the message sender's identification, is stored in the message recipient's voice mail box. Destination voice mail service system 150 transmits a control message via data link 155 to telephone switching system 140 to indicate the presence of a voice mail message for the message recipient. Switch processor 142 responds to this control message by activating the message waiting indicator on the message recipient's telephone station set T160.

The message recipient scrolls through the messages stored on the various message service systems by activating the message retrieval function on telephone station set 160. Switch processor 142 responds to the message retrieval request by sequentially transmitting display messages to telephone station set T160. Each display message identifies a message sender who left a message for the message recipient on one of the message service systems. In existing voice mail service systems, a message sender identification is unavailable and the display message simply indicates "You have voice mail". The present system provides the identification of the message sender for voice mail messages for the message recipient. Switch processor 142 transmits a voice mail message query to voice mail service system 150 via DCIU 143 and data link 155. Feature processor 152 responds to the voice mail message query by retrieving the header of each unretrieved voice mail message stored for the message recipient in voice mail service system 150. Feature processor 152 transmits a voice mail message log containing the name of the message sender in text form; the telephone number of the message sender and the message delivery time to switch processor 142 via data link 155 and DCIU 143.

Switch processor 142 formats each header received from feature processor 152 into a display message and transmits the display message to the message recipient's telephone station set T160. The display message indicates the identity and telephone number of the message sender as well as the time of message delivery. The format of this display message is consistent with display messages from the other message service systems, such as message center service system 120 and the leave word calling feature of telephone switching system 140.

The following description provides a more detailed explanation of the disclosed embodiment. A typical voice mail message creation and delivery session is described as well as the subsequent voice mail message scrolling operation. This description begins with a further review of a typical voice mail service system.

Voice Mail Service System

Figure 2:
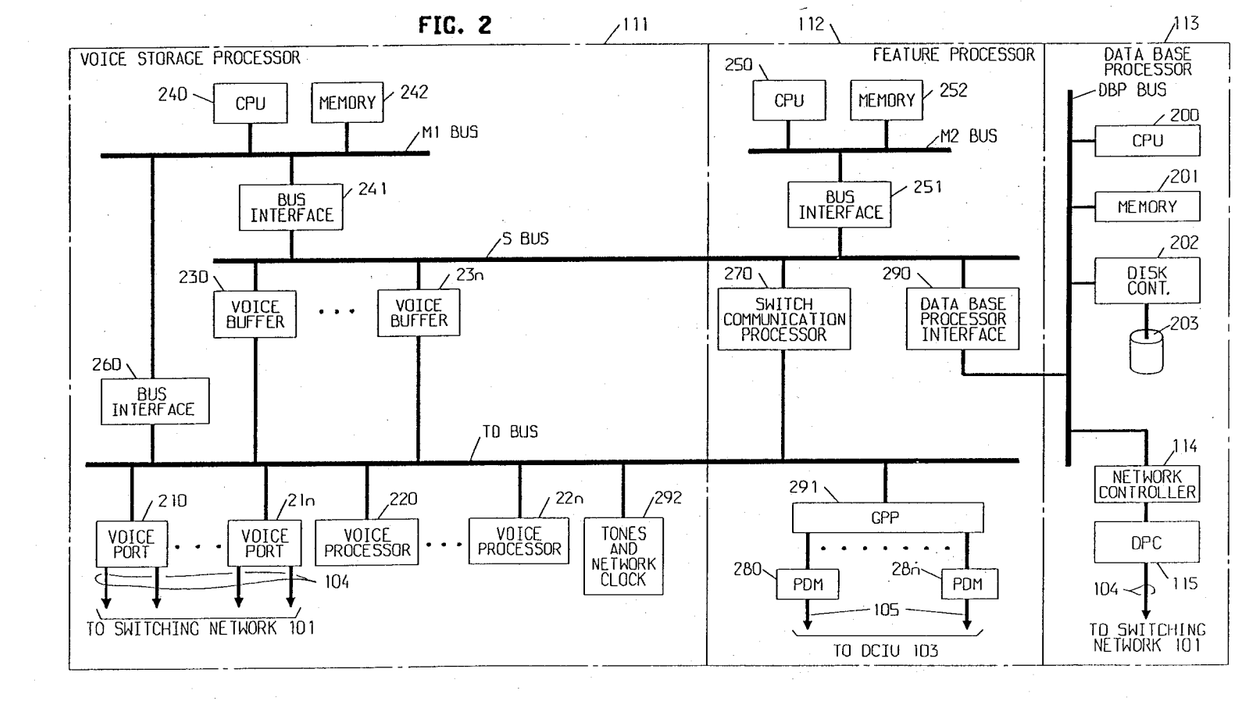
FIG. 2 illustrates the voice mail service system in block diagram form.

Voice mail service system 110 is disclosed in block diagram form in FIG. 2. This system comprises three main elements: voice storage processor 111, feature processor 112 and data base processor 113. Broadly stated, the voice storage processor controls the following:

a. Keeping track of control information about current voice messages being played or recorded, including where in the message the caller stopped playback, and whether the caller is playing back or recording.
b. Opening voice channels in preparation for recording or playback.
c. Closing voice channels to end recording or playback.
d. Controlling playback speed.
e. Controlling playback volume.

Feature Processor 112 controls the following functions:

a. Controlling message headers-how they are read and created.
b. Concatenating two messages together, or duplicating a voice message.
c. Erasing a message (includes telling the data base processor system to deallocate all extents associated with this message).
d. Rewinding a message.
e. Keeping track of problems so that information can be provided to the caller when questions arise.
f. Retrieving messages from a caller's mailbox and preparing to play back both the message summary and the message body.
g. Skipping to the next message (if any).
h. Saving a message for later playback (becomes an old message in the mailbox).
i. Verifying the password typed in by the caller.
j. Retrieving distribution lists to later send out messages.
k. Controlling the delivery of messages.
l. Storing a working message, one per subscriber.
m. Retrieving initial lists of all messages (both new and old) in a user's mailbox.
n. Deleting a message and clearing up the disk space for later use.
o. Retrieving a list of outgoing messages to report the status of each.
p. Canceling the delivery of a piece of undelivered mail.
q. Notifying system processor when all messages are accessed.

Data Base Processor

Data base processor system 113 is a back-end file system and data base machine. As a back-end processor, data base processor system 113 serves to offload file system and data base operations from voice storage processor 111. It also provides all the non-volatile storage used by voice storage processor 111.

Both voice and non-voice files are stored by data base processor system 113 for voice mail service system 110. The voice files will include announcements and messages. The non-voice files will include system programs, system data, and user data. Data base processor system 113 provides basic file system support for voice mail service with functions which include, but are not limited to: File system management functions (e.g., create, modify, delete, backup, recover, and report status of files and file systems); File manipulation functions (e.g., insert, modify, delete data in a file); File level concurrency control functions; Data base processor system administration functions; Data base processor system maintenance functions.

Data base processor 113 includes central processing unit (CPU) 200, memory 201 and disk controller 202. Central processing unit 200 operates under control of instructions stored in memory 201 to transfer data from DBP BUS to disk storage 203 via disk controller 202. This operation is well-known and is not discussed further herein. Data base processor 113 also includes network controller 114 which is an interface device that operates under control of feature processor CPU 250 to transmit a data file from disk storage 203 to DCP port 115. The DCP port 115 is a standard data port connected to switching network 101 and functions to provide data call connection capability between voice mail service systems.

Voice Processors

Voice processors (220-22n) and voice ports (210-21n) take care of the following physical operations: touchtone signal receiving; answer, disconnect; ring detection; digit queuing; bandwidth compression (compress the voice data from 64k bits/s down to 16k bits/s) and expansion; silence compression (encode the length of long silences so that the encoded length value rather than the actual silent interval can be stored on disk) and expansion; playback speed control (speed-up or slowdown the rate of playback); playback volume (louder or softer); automatic gain control; per port timing (intertoken timing); freezing a voice channel to temporarily stop recording or playback; applying audible tone right before recording to signal the caller to begin; monitoring how much is recorded, and freezing the channel when a maximum is reached.

Voice Interface Operation

Telephone switching system 100 establishes a voice communication connection from an individual at telephone station set T100 to one of voice mail service access lines 104, and applies ringing signal to the selected voice mail service access trunk. No action is taken by voice mail service system 110 due to this ringing signal. The call will be answered when a connect message identifying an incoming call on one of voice mail service access lines 104 is transmitted to voice mail service system 110 by system processor 102 via data communication interface unit 103 and data link 105. After closing the loop on the identified voice mail service access line 104 as an answer signal, voice storage processor 111 monitors the flow of loop current on this trunk to insure a complete connection.

When telephone switching system 100 disconnects a call from a voice mail service access line 104, no immediate signal is sent over voice mail service access line 104 to voice mail service system 110. The loop is opened on voice mail service access line 104 for a time sufficient to be recognized as an on-hook signal by telephone switching system 100 when a disconnect message identifying an existing connection is received by voice storage processor 111.

An individual at telephone station set T100 activates the desired feature of voice mail service system 110 in well-known fashion by simply dialing a code designating the desired feature. To illustrate, assume the user wishes to create a voice message for transmittal to a number of destinations. The user dials the "create" digit on telephone station set T100, which dialed digit is transmitted via the voice communication connection to voice port 210 and thence via TD bus to tone detector circuit 292. Tone detector circuit in voice processor 220 decodes the dialed digit and transmits a data message to CPU 240 via TD bus, bus interface 260 and M1 bus. CPU 240 interprets this data message and causes a voice connection to be established from voice port 210 to a voice processor 220 where the voice message is converted to digitally encoded voice signals. These voice signals are transmitted via TD bus, a selected voice buffer 230, S bus, data base processor interface 290 to data base processor 113 where the encoded voice is stored for later retrieval.

This voice mail service system 110 outlined above is a standard commercially available voice mail service system known as AUDIX that is available from AT&T Information Systems. The exact operation of this system is not of paramount importance, but is described in general fashion to provide a better understanding of the subject message service system network capability. The data communication segment of this arrangement is now disclosed to illustrate the apparatus that interconnects switch processor 102 with voice mail service system 110 to provide the message service system network capability.

Data Communication Interface Unit

The Data Communication Interface Unit (DCIU) 103 of telephone switching system 100 is used to connect voice storage processor 111 to switch processor 102. Data communication interface unit 103 and other hardware components, the protocol, and the types of messages on this interface are described in this section.

Data communication interface unit 103 is necessary for the operation of voice mail service system 110. Voice storage processor 111 needs a connect message to know when to answer an incoming call on voice mail service access lines 104, because it does not act on ringing on the voice mail service access lines 104. The connect message also informs voice storage processor 111 if the call is a Voice Mail call or a Call Answer call and provides the calling and called party identification. Data communication interface unit 103 is needed for the control of the automatic message waiting indicators, and the integration of the lamp message waiting indication feature with other services.

Figure 3:
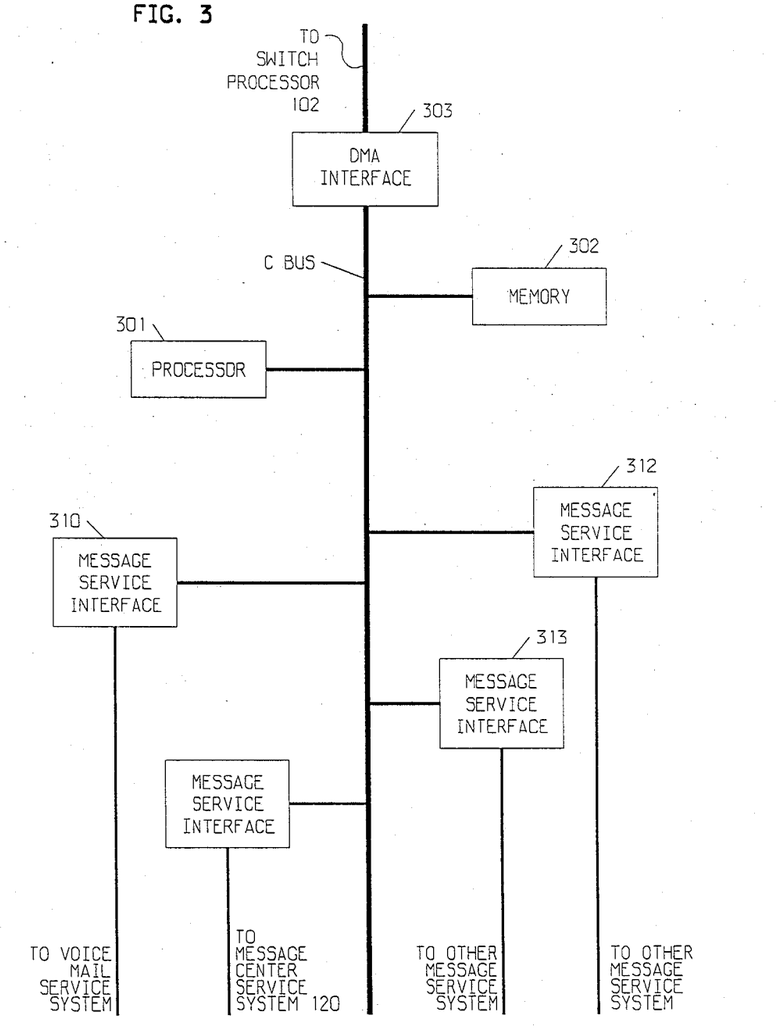
FIG. 3 illustrates the data channel interface unit in block diagram form.

The general structure of data communication interface unit 103 is illustrated in FIG. 3 in block diagram form. This circuit is a data transfer arrangement that functions to transmit a message from a main memory to a communication channel. Such circuits are well-known and U.S. Pat. No. 4,133,030 describes one such arrangement. U.S. Pat. No. 4,133,030 provides a block transfer arrangement but the concepts taught therein are applicable to the message transmission arrangement of data communication interface unit 103.

The operation of data communication interface unit 103 is controlled by processor 301 that is programmed by software stored in memory 302. Processor 301 responds to messages arriving either at interface 303 from switch processor 102 or at message services interface 310-313 from one of the message service systems by reading the message from the receiving interface circuit via common bus CBUS. The message is routed by processor 301 to the interface circuit that serves the intended destination. This is described in further detail below.

Protocol Between Voice Mail Service System 110 and Telephone Switching System 100

The sections that follow summarize the relevant points of the protocol.

Physical-Layer 1

Data communication interface unit 103 communicates with other devices through the physical data links. The data communication interface unit 103 has 8 data links for connecting switch processor 102 to a maximum of 8 other processors. Also, it can provide a connection between any of the other processors without involving switch processor 102. (See U.S. Pat. No. 4,488,004 for additional details.) Each data link will have a maximum 19.2k bits/s data rate. A DMA interface circuit 303 is used to connect data communication interface unit 103 to switch processor 102. However, it is appropriate to regard this DMA connection as a ninth Data link. In summary, data communication interface unit 103 will support 9 data links, one of which is a connection to system processor 102 via DMA interface 303.

The data communication interface unit 103 communication with voice storage processor 111 is through a Processor Data Module (PDM)(280-28n), which is in turn connected to the General Purpose Port (GPP) 291 on the voice storage processor 111 side. On the voice storage processor 111 side, the general purpose port 291 is connected to switch communication processor 270 through the TD bus. General purpose port 291 will provide a total of 4 physical links. One will be connected to data communication interface unit 103 via processor interface module 280 and the others will be available for connections to other devices, via other processor interface modules. The conceptual view of these data links is that these are 5 data links; 4 are physical cables that are connected to general purpose port 291, the fifth data link is the DMA connection across the S bus to Feature Processor CPU 250.

Data Link-Layer 2 and Packet-Layer 3

Level 2 handles the sending of packets of data over the physical link and provides flow control, error detection, and error recovery.

Level 3 creates logical channels that are used to multiplex packets over one data link. Each data link in the data communication interface unit 103 will support 64 logical channels, that can be uniquely identified with the data link number and logical channel number.

On the switch processor 102 side of the interface, data communications interface unit 103 handles levels 2 and 3 of the protocol. The data link between switch processor 102 and data communication interface unit 103 can support a maximum of 64 logical channels.

All message transmission through data communication interface unit 103 is done through a network channel. A network channel is the name for a connection between 2 logical channels. It is made by mapping a logical channel data link pair to a logical channel data link. Logical channels and therefore network channels support bi-directional communication.

Although there are 64 logical channels on each of the links, not all of these can be used because there is a limit of 128 network channels on each data communication interface unit 103.

On the feature processor 112 side of the interface, the Data Link-Layer 2 and the Network-Layer 3 is handled by switch communication processor 270. Switch communication processor 270 is connected to the Time Division (TD) bus and connected to feature processor CPU 250 by means of S bus, bus interface 251 and M2 bus. Bus interface 270 provides the layers of protocol provided by data communication interface unit 103.

Session Laver of the Protocol

The session layers correspond to a subset of the combination of the following International Standard Organization (ISO) protocol model layers: the transport layer 4, the session layer 5, and the presentation layer 6. The session layer is called the level 4, it is concerned with sequencing of messages and uses level 3 to provide end to end confirmation of messages. At the boundary between levels 3 and 4, the level 3 logical channels are mapped, one to one, to ports in level 4. These logical channels and ports are translated one to one in numerical order.

In switch processor 102, each Application program talks to data communications interface unit 103 via the DCIU Interface Program (DIP). The DCIU interface program implements the session layer of the protocol, and DCIU interface program serves as an interface between data communications interface unit 103 and the system processor application programs.

In voice mail system 110, the session layer is handled in the VMS Interfaces Program (VIP) that resides on feature processor 112. VIP also communicates with other voice storage processor 111 application processes and passes information between them and switch processor 102.

Application Messaoes

Data communication interface unit 103 performs a switching function as outlined above. Both switch processor 102 and the various message service systems 120 can originate messages which are transmitted through data communication interface unit 103 to a designated destination. The messages transmitted are discussed below and clarify the routing of the message through data communication interface unit 103.

The following descriptions of the content of each message are logical descriptions and not physical formats for implementation. Each message contains a message opcode followed by the content of the message.

Switch Processor 102 to Voice Storage Processor 111

CONNECT MESSAGE. When a call is switched to one of the voice mail service access lines 104 connected to voice storage processor 111, the appropriate information is sent to voice storage processor 111 in a Connect Message. The voice storage processor 111 voice port to which the call is connected is identified by using the ringing extension number. The content of the message is shown below.
 Connect—opcode and identification of the message service system.
 Ringing Extension—extension number of the port receiving that call.
 Call Type—indicates whether calling party is a trunk or a line. If the call is on a trunk it is 'external.' If the call is on a line, it is 'internal.' The opcodes are: (0) means line; (1) means trunk.
 Calling Party—is the trunk group number or extension number of the calling party depending on the Call Type.
 Reason for Call—why the call is being sent to VMS. The possible reasons are:
  Direct—VMS is being called directly.
  Redirected—The call was redirected to VMS.
 Called Extension—is the original extension number being called. This can be ignored for calls with reasons of type Direct, because it would be the same as the Ringing Extension or Associated Extension.
 Switch Message Waiting Indicator Status—is a bit map of the message waiting indicator status of the calling extension for each of several message service systems that use the message waiting indicator.

Thus, the message includes both an opcode and an indication of the destination to which this message is intended. Processor 301 decodes the opcode and destination information to determine the one of message service interfaces (ex. 310) to which the message is routed by processor 301. Message service interface 310 responds to a message received from processor 301 over CBUS by transmitting the message to voice mail service system 110 via data link 105.

The transmitted message is received (as described above) by PDM 280 and routed through general purpose port 291, TD BUS, switch communication processor 270, S BUS, bus interface 251, M2 BUS to feature processor CPU 250. Feature processor CPU 250 responds to the received message in standard fashion to complete the voice connection from telephone station set T100 to voice mail service system 110 via the selected voice port (ex. 210).

DISCONNECT MESSAGES. When the user of VMS goes on hook, switch processor 102 notifies voice storage processor 111 the call has terminated.
 Disconnect—opcode for disconnect, reason for disconnection and identification of the message service system.
 Ringing Extension—ringing extension of the port in the call.

Voice Mail Message Forwarding

A message sender (at telephone station set T100) in originating a voice mail message on voice mail service system 110 designates the time that this voice mail message is scheduled for delivery to the message recipient (telephone station set T160). This designated message delivery time is stored with the voice mail message in voice mail service system 110. A voice mail message delivery queue exists in feature processor 112 in memory 252 for each of the remotely located voice mail service systems (ex-150) in the voice mail message service system network. The voice mail messages are entered in time ordered sequence to the appropriate queue in feature processor memory 252.

Figure 7:
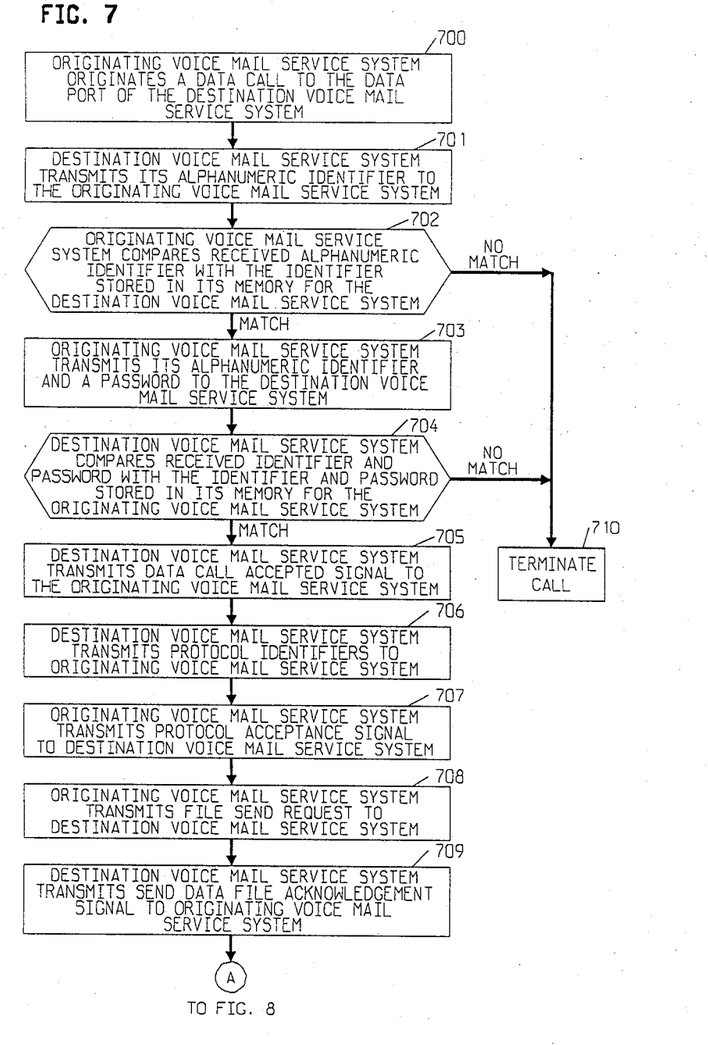
FIGS. 7 and 8 illustrate, in flow diagram form, the operation of the subject message service system network to provide message transfer between a plurality of message service systems.
Figure 8:
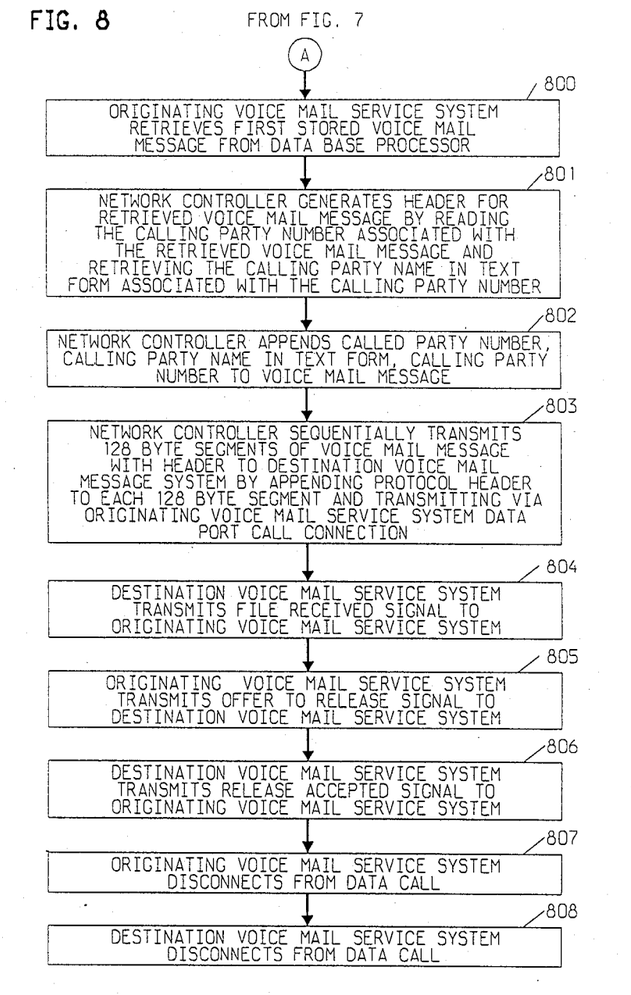

Each of the voice mail service systems in the message service system network transmits voice mail messages to other ones of the voice mail service systems in the network at prescheduled times of day. For example, feature processor CPU 250 periodically scans each voice mail message delivery queue stored in memory 252 and, at the prescheduled time, transmits the queued messages that are scheduled for delivery during a succeeding time interval. FIGS. 7 and 8 illustrate, in flow diagram form, the sequence of operations to accomplish the message transmission sequence. At step 700 on FIG. 7, the originating voice mail service system 110 originates a data call connection from its data port 115 to the data port of the destination voice mail service system 150. This is accomplished by feature processor CPU 250 which retrieves the telephone number of the data port associated with destination voice mail service system 150 from memory 252. CPU 250 transmits the retrieved telephone number along with a data file identifier to network controller 114 via M2 BUS, bus interface 251, S BUS, data bus processor interface 290 and DBP BUS. The data file identifier indicates which of the voice mail messages stored on disk storage units 302 are scheduled for transfer to the identified destination voice mail service system 150. This retrieved telephone number is used by network controller 114 to establish a data call to destination voice mail service system 150. Network controller 114 activates data port circuit 115 which performs the call origination function in well-known fashion. The data call is placed from data port circuit 115 of voice mail service system 110 via switching network 101 of telephone switching system 100, one of trunks TR1-TRn, central exchange office 130, one of trunks TR171TR17n, switching network 141 of telephone switching system 140 to destination voice mail service system 150 where the call is terminated on the corresponding data port (not shown). This data call connection can be established using various types of transmission facilities. Advantageously, the transmission facilities are high speed digital facilities of the type used for computer data file transfers. The use of digital high speed transmission facilities of speed greater than 9.6 Kbps enables the exchange of digitally encoded and compressed voice mail messages faster than real time speech.

Login Sequence

A data call connection now exists between voice mail service systems 110 and 150. These two voice mail service systems 110 and 150 respond to the data call connection at step 701 by establishing a positive identification of the two connected systems for security purposes. In particular, destination voice mail service system 150 transmits its alphanumeric identifier to originating voice mail service system 110. At step 702, originating voice mail service system 110 compares the received alphanumeric identifier with the identifier stored in this memory for the destination voice mail service system 150. If there is no match between these two numbers, the call is terminated at step 710. Assume for the purpose of this description that the received alphanumeric identifier matches that stored in the memory of originating voice mail service system 110. In that case, call processing advances to step 703 where originating voice mail service system 110 transmits its alphanumeric identifier as well as a password to destination voice mail service system 150. At step 704, destination voice mail service system 150 compares the received identifier and password with the identifier and password stored in its memory for originating voice mail service system 110. As before at step 702, if no match occurs between the received and stored identifier and passwords, call processing advances to step 710 were the call is terminated. Assume for the purpose of this description that the received information matches that stored in the memory of destination voice mail service system 150. Destination voice mail service system 150 responds to the occurrence of a match by transmitting a data call acceptance signal to originating voice mail service system 110 over the data call connection at step 705. At step 706, the destination voice mail service system 150 transmits protocol identifiers to originating voice mail service system 110 to indicate the signaling format required for communication between the two voice mail service systems 110 and 150. At step 707, originating voice mail service system 110 responds to the received protocol identifiers by selecting the appropriate protocols for its transmissions. Originating voice mail service system 110 transmits a protocol acceptance signal indicating the protocol used for further transmissions to destination voice mail service system 150. At step 708 originating voice mail service system 110 transmits a file send request over the data call connection to destination voice mail service system 150. At step 709 destination voice mail service system 150 responds to the file send request by transmitting a data file acknowledgement signal to originating voice mail service system 110. This exchange of signals completes the handshaking between the two voice mail service systems 110, 150 and the two voice mail service systems are ready to exchange stored voice mail messages.

Voice Mail Message Transmission Protocols

Figure 4:
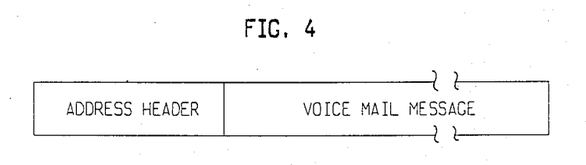
FIGS. 4-6/ illustrate various message formats.
Figure 5:
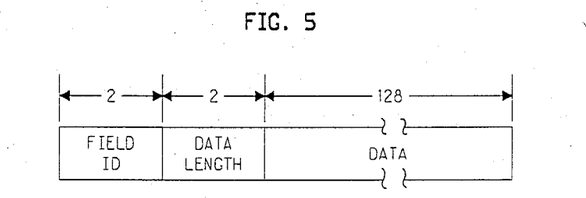
Figure 6:
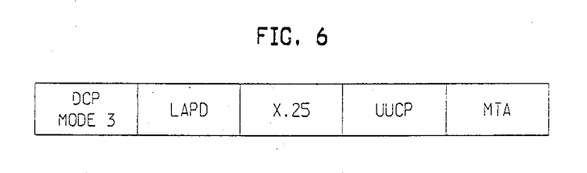

On FIG. 8, the flow chart continues for the description of the transmission of a voice mail message stored in voice mail service system 110 over the data call connection to destination voice mail service system 150. This process begins at step 800 where network controller 114 of originating voice mail service system 110 retrieves the first voice mail message stored in the disk storage 203 of data base processor 113. This is accomplished in well-known fashion by network controller 114 retrieving the stored voice mail message from disk storage 203 via disk controller 202, and DBP BUS. At step 801, network controller 114 generates a header for the retrieved voice mail message by reading data from disk storage 203 designating the message sender's telephone number associated with the retrieved voice mail message. Network controller 114 uses the retrieved message sender's telephone number to scan data stored in data base processor 113 which contains a correspondence between message sender's telephone party numbers and names of message senders. In this fashion, network controller 114 retrieves the message sender's name in text form from disk storage 203. Network controller 114 at step 802 appends the message sender's telephone number, the message sender's name in text form and the message sender's telephone number to the voice mail message retrieved from disk storage 203. The resultant voice mail message is illustrated in FIG. 4 and comprises the address header indicating message sender and message recipient identification appended to the voice mail message stored by the message sender in voice mail service system 110. This voice mail message illustrated in FIG. 4 can be of any length and is transmitted by network controller 114 in 128 byte segments. Network controller 114, at step 803, retrieves the first 128 bytes of the data illustrated in FIG. 4 and appends a number of protocol headers for transmission over the data call connection to voice mail service system 150. These protocol headers are illustrated in part in FIG. 5. The data from FIG. 4 is illustrated on FIG. 5 as data comprising a 128 byte seqment of the composite voice mail message. To this data is added a data length field of two bytes to indicate the amount of data contained in the data field. In addition, a field identifier of two bytes is added to this message to indicate the type of data and additional control information required for communication between the two voice mail service systems. FIG. 6 illustrates the various data protocol headers added to the information of FIG. 5. There is a protocol field in FIG. 6 for each interface or layer of the protocol which must be traversed in the data call connection from originating voice mail service system 110 to destination voice mail service system 150. The first of these protocols from right to left is identified as Message Transport Architecture (MTA) which is the application and presentation layer protocols used by the voice mail service system for communication with other voice mail service systems. The next protocol is identified as UUCP. This protocol is the well-known UNIX to UNIX data file transfer protocol which is a computer to computer exchange of a data file. This protocol is provided so that network controller 114 can perform the data file transfer as a standard UNIX data file transfer between two processors. The next protocol is x.25 which is the well-known commercially available data transport protocol for data call connections. Similarly, the LAPD and DCP protocol fields comprise data call connection protocols for the data call connection through the telephone switching system 110 over the data call connection to destination voice mail service system 150. All of the headers illustrated in FIG. 6 are added to the composite data message of FIG. 5 for each 128 byte segment of the voice mail message that is transmitted between the two voice mail service systems.

These data protocols are particularly advantageous for the transmission of the voice mail message. The voice mail message is stored in voice mail service system 110 in digitally encoded and compressed form. In order to preserve the quality of this voice mail message, the message G. D. Kepley 4-4-3 transmission apparatus must accurately transport this data to destination voice mail service system 150. Existing voice mail service systems convert the stored voice mail message into an audio signal, transmit this audio signal over standard telephone lines, then redigitize the voice message at the destination voice mail service system. This multitude of conversions and the use of potentially noisy voice-grade telephone lines results in unacceptably poor quality voice mail messages. The transmission of the voice mail message as an analog signal is timewise inefficient compared to the already compressed digitally encoded voice mail message stored in voice mail service system 110. In addition, the multiple conversions occupy scarce and expensive voice compression and encoding apparatus.

The present message service systems network uses high speed digital facilities to transport the voice mail message between voice mail service systems. The digitally encoded and compressed voice mail message is transmitted without conversion over these digital facilities between the voice mail service systems. Since the voice mail message is a data file, the computer-to-computer file transfer mechanism insures the integrity of the data comprising the voice mail message. The above-mentioned protocols are standard error correction and data integrity mechanisms to guarantee the accurate transport of the voice mail message in digital form. The transmission of the digitally encoded, compressed voice mail message over high speed digital facilities also is timewise efficient compared to transmitting the analog version of the voice mail message. One additional benefit of this arrangement is the ability to transmit the message sender's name in text form along with the voice mail message, as is described in more detail below.

At step 803, network controller 114 transmits the 128 byte segment with the header identified above over the data call connection through DCP port 115, switching network 101, one of trunks TR1-TRn, central exchange office 130, one of trunks TR171-TR17n, switching network 141 to destination voice mail service system 150. Destination voice mail service system 150 receives each 128 byte segment along with the header information and stores the message in the voice mail box in data base processor 153 associated with the message recipient identified in the address header illustrated in FIG. 4. In addition, voice mail service system 150 stores the message sender's name in text form as well as the message sender's telephone number in data base processor 153. Upon completion of the transmission of the voice mail message, destination voice mail service system 150 transmits a file received signal to originating voice mail service system 110 over the data call connection at step 804. In response to the file received signal, originating voice mail service system 110 transmits an offer to release signal to destination voice mail service 150 at step 805. If no further file transfers are to take place, destination voice mail service system 150 transmits a release acceptance signal at step 806 to originating voice mail service system 110. At steps 807 and 808, the two voice mail service systems disconnect from the data call connection and the file transfer session is completed.

Message Retrieval by the Message Recipient

Figure 9:
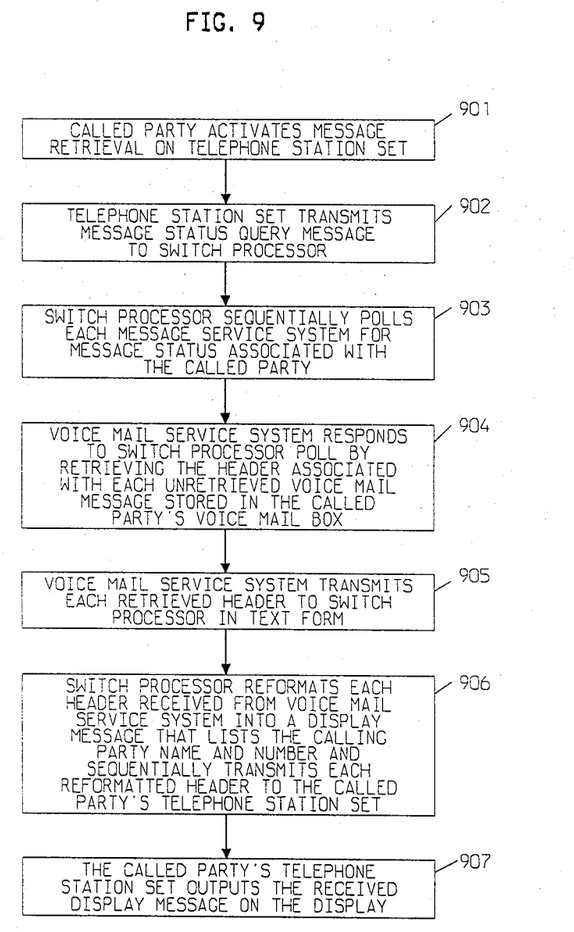
FIG. 9 illustrates, in flow diagram form, the operation of the subject message service system network to provide message retrieval by a called party.

The message recipient at telephone station set T160 receives and indication of a voice mail message stored in destination voice mail service system 150 by the activated message waiting indicator on telephone station set T160. The message recipient at telephone station set T160 activates the message retrieval function in well-known fashion to step 901 to scroll through the various messages stored on the various message service systems. The scrolling is accomplished by telephone station set T160 transmitting a message station query message to switch processor 142 at step 902. In response to this query message, switch processor 142 at step 903 sequentially polls each message service system to determine the message status of the message recipient. In response to the received status information, switch processor 142 transmits a display message to telephone station set T160 to indicate the nature of the message for the message recipient which message is displayed on the display of telephone station set T160. In the case of a voice mail message stored on voice mail service system 150, switch processor 142 has stored in its memory an indication that one or more messages for the message recipient are stored on voice mail service system 150. To obtain further information about the stored messages, switch processor 142 transmits via DCIU 143 and data link 155 a control message at step 903 to feature processor 152 of voice mail service system 150 to query voice mail service system 150 regarding the nature of the message stored for the message recipient on voice mail service system 150. Feature processor 152 retrieves header information at step 904 from data base processor 153 to identify the message sender, and the message sender's telephone number and the message delivery time associated with each voice mail message stored in data base processor 153 in the voice mailbox associated with the message recipient. Feature processor 152 transmits this message sender information as a control message over data link 155 through DCIU 143 to switch processor 142 at step 905. Switch processor 142 formats the message sender identification into a display message at step 906 and transmits this display message to telephone station set T160 where it is displayed in text form at step 907 on the display for the message recipient. Thus, the message recipient receives an indication of the identity of the message sender who left a voice mail message for the message recipient on voice mail service system 150 without having to access voice mail service system 150 to obtain such information.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the scope and the spirit of the invention.

What is claimed is:

1. A method of interconnecting a plurality of voice message service systems in a network for transmitting a voice message received from a messge sender on a first one of said message service systems to a message recipient at one other one of said message service systems comprising the steps of:
   encoding in digitally compressed form said received message;
   appending to said encoded message in text form, the name of said message sender for display purposes at said other one of said message service systems;
   storing the appended encoded message in a memory of said one message service system as a data file; and
   transmitting, as a computer-to-computer file transfer operation, said stored encoded message from said first message service system to said other message service system.

2. The method of claim 1 wherein said step of storing includes the step of:
   appending the telephone number of said message sender to said encoded message.

3. The method of claim 1 wherein the step of storing includes the step of:
   appending the telephone number of said message recipient to said encoded message.

4. The method of claim 1 wherein the step of storing includes the step of:
   recording a designated time of delivery for said encoded message in a message delivery queue of said first message service system.

5. The method of claim 4 wherein said step of transmitting includes the steps of:
   periodically scanning said message delivery queue to determine whether a stored message is presently due for delivery;
   establishing a data call connection from said first message service system to said other message service system in response to determining the presence of a stored message in said message delivery queue that is presently due for delivery; and
   outputting said stored message from said first message service system to said other message service system over said data call connection.

6. The method of claim 1 wherein said step of transmitting includes the steps of:
   establishing a data call connection from said first message service system to said other message service system; and
   transferring said stored encoded message from said first message service system to said other message service system over said data call connection.

7. The method of claim 6 wherein said step of transferring includes the steps of:
   formating said stored encoded message into a plurality of message segments; and
   appending a data transmission protocol header to each of said message segments to insure the integrity of the data contained in said message segments.

8. The method of claim 7 wherein said step of transferring further includes the step of:
   sequentially outputting said header appended message segments on said data call connection to said other message service system.

9. A method of interconnecting a plurality of voice message service systems in a network for transmitting a voice message received from a message sender on a first one of said message service systems to a message recipient at one other of said message service systems comprising the steps of:
   encoding in digitally compressed form said received message;
   appending to said encoded message the name of said message sender in text form;
   storing said appended encoded message in a memory of said first message service system as a data file;
   transmitting, as a computer-to-computer file transfer operation, said data file from said first message service system to said other message service system;
   retrieving, in response to a message retrieval request from said message recipient, said message sender name from said data file; and
   displaying said message sender's name in text form on a communication terminal associated with said message recipient.

10. The method of claim 9 wherein the step of transmitting comprises the steps of:
    establishing a data call connection from said first message service system to said other message service system; and
    transferring said data file from said first message service system to said other message service system over said data call connection.

11. The method of claim 10 wherein said step of transferring includes the steps of:
    formating said data file into a plurality of message segments; and
    appending a data transmission protocol header to each of said message segments to insure the integrity of the data contained in said data file.

12. A method of interconnecting a plurality of voice message service systems in a network for transmitting a voice message received from a message sender on a first one of said message service systems to a message recipient at one other one of said message service systems comprising the steps of:
    encoding in digitally compressed form said received message;
    appending to said encoded message the name of said message sender in text form;

recording a designated time of delivery for said appended encoded message in a message delivery queue of said first message service system;

storing said appended encoded message in a memory of said first message service system as a data file;

periodically scanning said message delivery queue to determine whether a stored message is presently due for delivery;

establishing a data call connection from said first message service system to said other message service system in response to determining the presence of a stored message in said message delivery queue that is presently due for delivery; and transmitting said stored message from said first message service system to said other message service system over said data call connection.

* * * * *